United States Patent
Holt et al.

(10) Patent No.: US 6,731,486 B2
(45) Date of Patent: May 4, 2004

(54) OUTPUT-POWERED OVER-VOLTAGE PROTECTION CIRCUIT

(75) Inventors: James Holt, Los Altos, CA (US); John So, Fremont, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 49 days.

(21) Appl. No.: 10/027,708

(22) Filed: Dec. 19, 2001

(65) Prior Publication Data

US 2003/0112568 A1 Jun. 19, 2003

(51) Int. Cl.[7] .................................................. H02H 3/20
(52) U.S. Cl. .................................... 361/91.1; 361/18
(58) Field of Search ............................ 361/18, 54, 55, 361/56, 78, 79, 86, 88, 91.1, 111; 323/282, 284, 313

(56) References Cited

U.S. PATENT DOCUMENTS

| | | | |
|---|---|---|---|
| 4,573,099 A | 2/1986 | Ganesan et al. ............... 361/56 |
| 4,879,625 A | 11/1989 | Potenzone .................... 361/90 |
| 5,057,709 A * | 10/1991 | Petty et al. .................... 327/77 |
| 5,063,304 A | 11/1991 | Iyengar .................... 307/296.6 |
| 5,088,018 A | 2/1992 | Lee .............................. 363/56 |
| 5,091,818 A | 2/1992 | Morikawa et al. ............ 361/56 |
| RE33,941 E * | 5/1992 | Lorincz et al. ............... 361/87 |
| 5,111,353 A | 5/1992 | Kotowski et al. ............ 361/91 |
| 5,130,883 A | 7/1992 | Edwards ...................... 361/91 |
| 5,161,183 A | 11/1992 | Maytum .................... 379/412 |
| 5,164,874 A | 11/1992 | Okano et al. ................. 361/56 |
| 5,285,344 A | 2/1994 | Heitzmann ................... 361/22 |
| 5,319,259 A | 6/1994 | Merrill ....................... 307/443 |
| 5,335,132 A | 8/1994 | DeShazo, Jr. ................ 361/18 |
| 5,359,281 A | 10/1994 | Barrow et al. .............. 323/284 |
| 5,381,061 A | 1/1995 | Davis .......................... 326/57 |
| 5,479,119 A | 12/1995 | Tice et al. .................... 327/74 |
| 5,483,406 A | 1/1996 | Bennett et al. ............... 361/56 |
| 5,581,170 A | 12/1996 | Mammano et al. ........... 320/17 |
| 5,654,858 A | 8/1997 | Martin et al. ................. 361/56 |
| 5,751,531 A | 5/1998 | Rault ........................... 361/56 |
| 5,764,467 A | 6/1998 | Seo ............................. 361/91 |
| 5,771,162 A | 6/1998 | Kwon ......................... 363/56 |
| 5,781,390 A | 7/1998 | Notaro et al. ................ 361/84 |
| 5,784,231 A | 7/1998 | Majid et al. ................. 361/18 |
| 5,815,359 A | 9/1998 | Maytum et al. ........... 361/111 |
| 5,818,120 A | 10/1998 | Palara ...................... 307/10.6 |
| 5,818,670 A | 10/1998 | Ahn ............................. 361/18 |
| 5,930,096 A | 7/1999 | Kim ............................ 361/91 |
| 5,963,407 A | 10/1999 | Fragapane et al. ........... 361/42 |
| 6,037,762 A * | 3/2000 | Koelling et al. ............ 323/313 |
| 6,052,022 A | 4/2000 | Lee ............................ 327/589 |
| 6,061,218 A | 5/2000 | Ida et al. ..................... 361/56 |
| 6,100,677 A | 8/2000 | Farrenkopf ................ 323/285 |
| 6,411,482 B1 * | 6/2002 | Funke ....................... 361/91.1 |
| 6,462,554 B2 * | 10/2002 | Brown ....................... 324/500 |

OTHER PUBLICATIONS

Analog Devices, "IMVP–II–Compliant Core Power Controller for Mobile CPUs," ADP3422.
Maxim, "Notebook CPU Step–Down Controller for Intel Mobile Voltage Positioning (MVP–II)," www.maxim-ic.com, Feb. , 2001, MAX1718.
Semtech, "Portable IMVP–IV™ Dual Phase Power Supply Controller," Sep. , 2001, SC1476.

(List continued on next page.)

*Primary Examiner*—Michael Sherry
*Assistant Examiner*—Gary L. Laxton
(74) *Attorney, Agent, or Firm*—Sidley Austin Brown & Wood LLP

(57) ABSTRACT

A circuit is provided to regulate an output voltage. The circuit includes an upper transistor connected to an input voltage from a voltage source, a lower transistor connected to the upper transistor, a pulse width modulator for generating control signals for the upper and lower transistors and a voltage protection circuit. The voltage protection circuit includes an over-voltage detector circuit powered by the regulated voltage. The voltage protection circuit can cause the lower transistor to draw sufficient current from the voltage source such that an over-voltage condition becomes abated.

13 Claims, 3 Drawing Sheets

OTHER PUBLICATIONS

Texas Instruments, "High–Density Synchronous Buck Converter Design Using TPS56xx Controller", User's Guide, Jun. 1999.

Harris Corporation, "Advanced PWM and Dual Linear Power Control with Integrated ACPI Support Interface," Dec. 1998, HIP6028.

Di Bernardo et al., "Grazing, skipping and sliding: analysis of the non–smooth dynamics of the DC/DC buck converter," Sep. 22, 1997, journal of publication unknown.

Intersil, "Microprocessor CORE Voltage Regulator Multi–Phase Buck PWM Controller," Mar. /2000, file 4765.1.

National Semiconductor, "LM2633, Advanced Two–Phase Synchronous Triple Regulator Controller for Notebook," www.national.com/pf/LM/LM2633.html, 2002.

Linear Technology, "Dual High Efficiency, Low Noise, Synchronous Step–Down Switching Regulators," 1996, LTC 1538–AUX/LTC 1539.

Linear Technology, "Wide Operating Range, No Rsense™ Step–Down Controller," 2001, LTC1778/LTC1778–1.

Analog Devices, "5–Bit Programmable 2–Phase Synchronous Buck Controller," 2001, ADP3160.

Analog Devices, "5–Bit Programmable Dual Power Supply Controller for Pentium® III Processors," 1999, ADP3154.

* cited by examiner

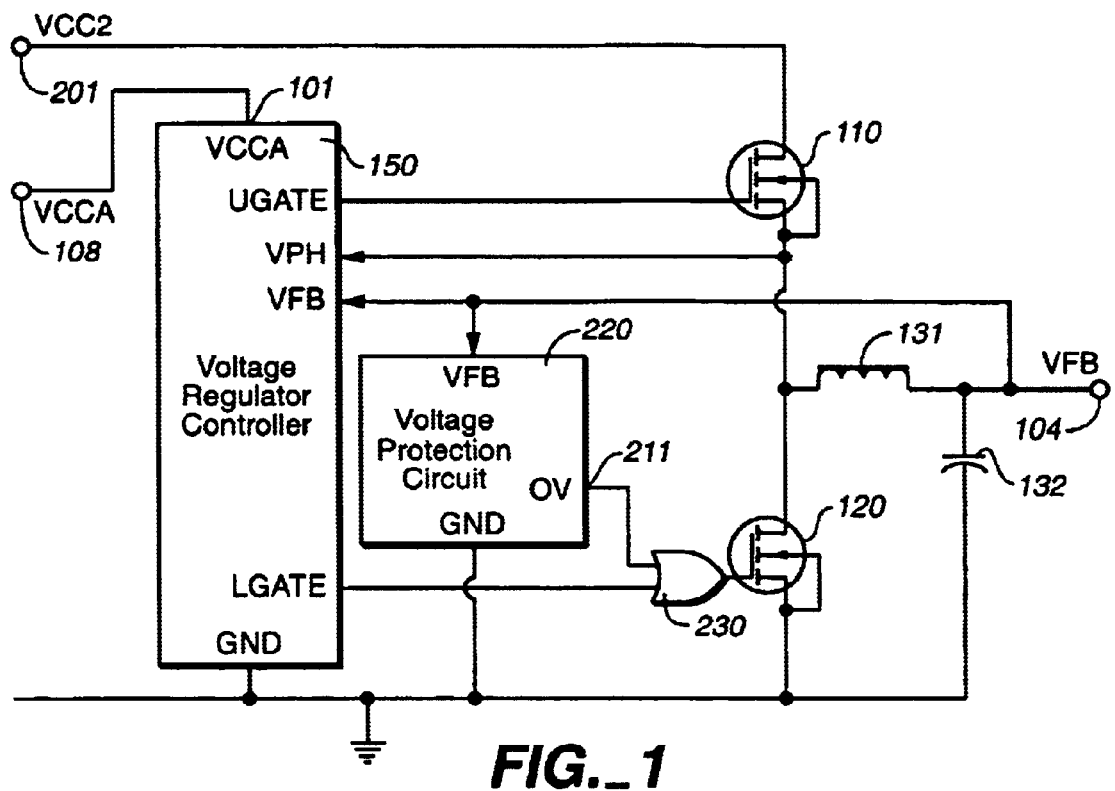
FIG._1
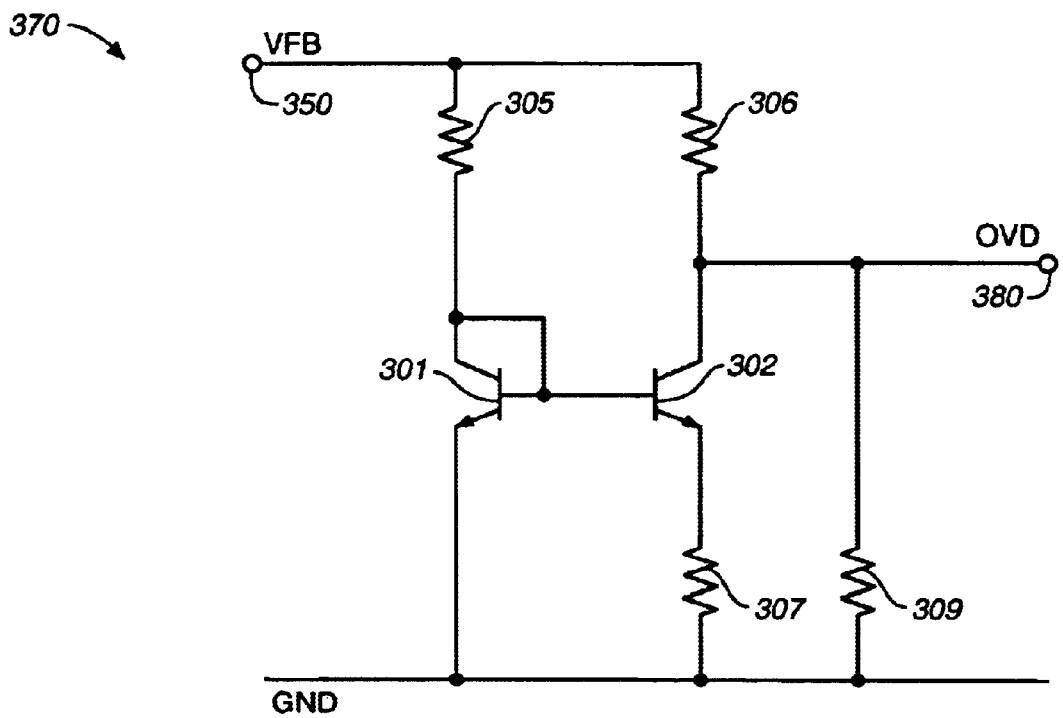
FIG._2

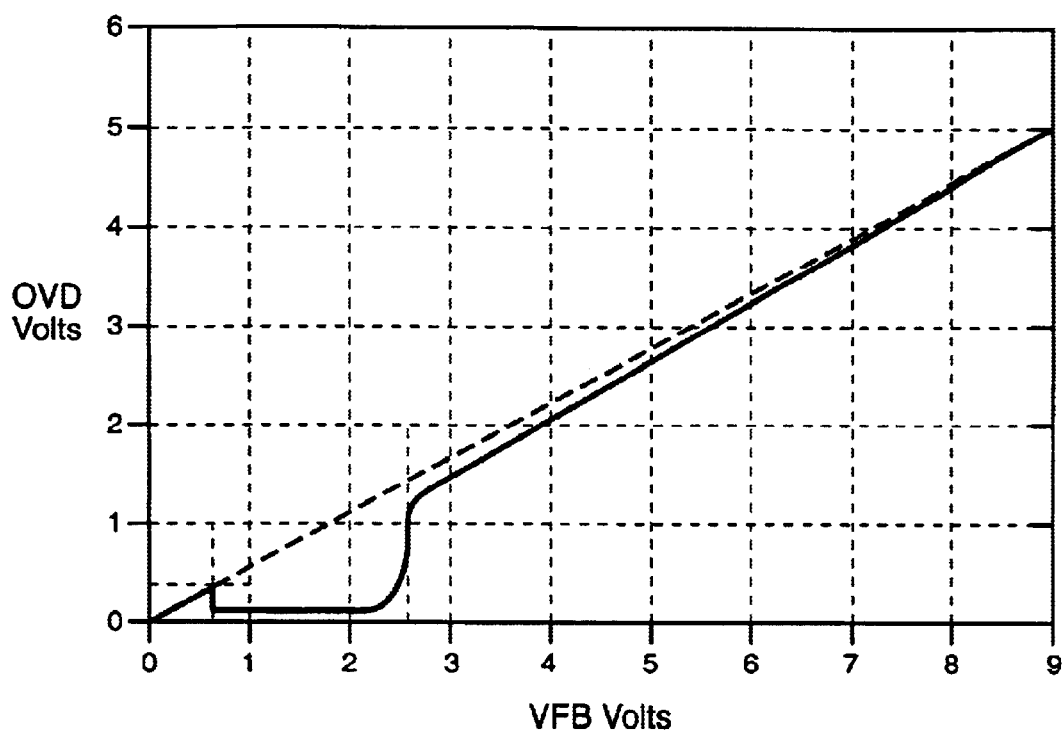
FIG._3

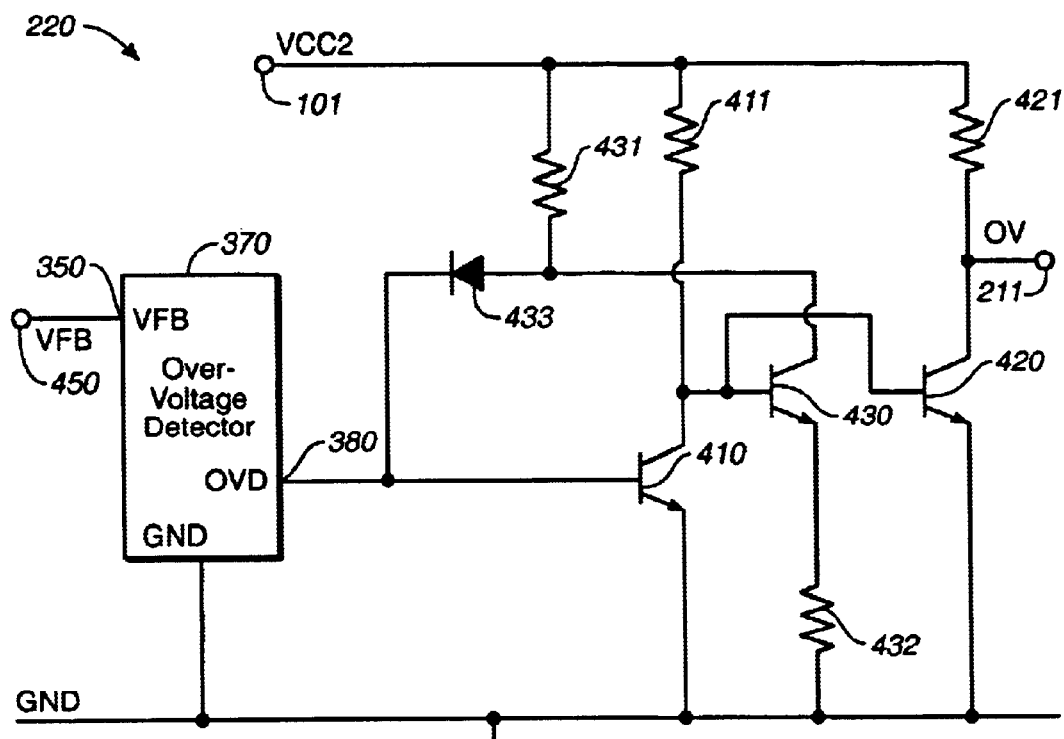
FIG._4
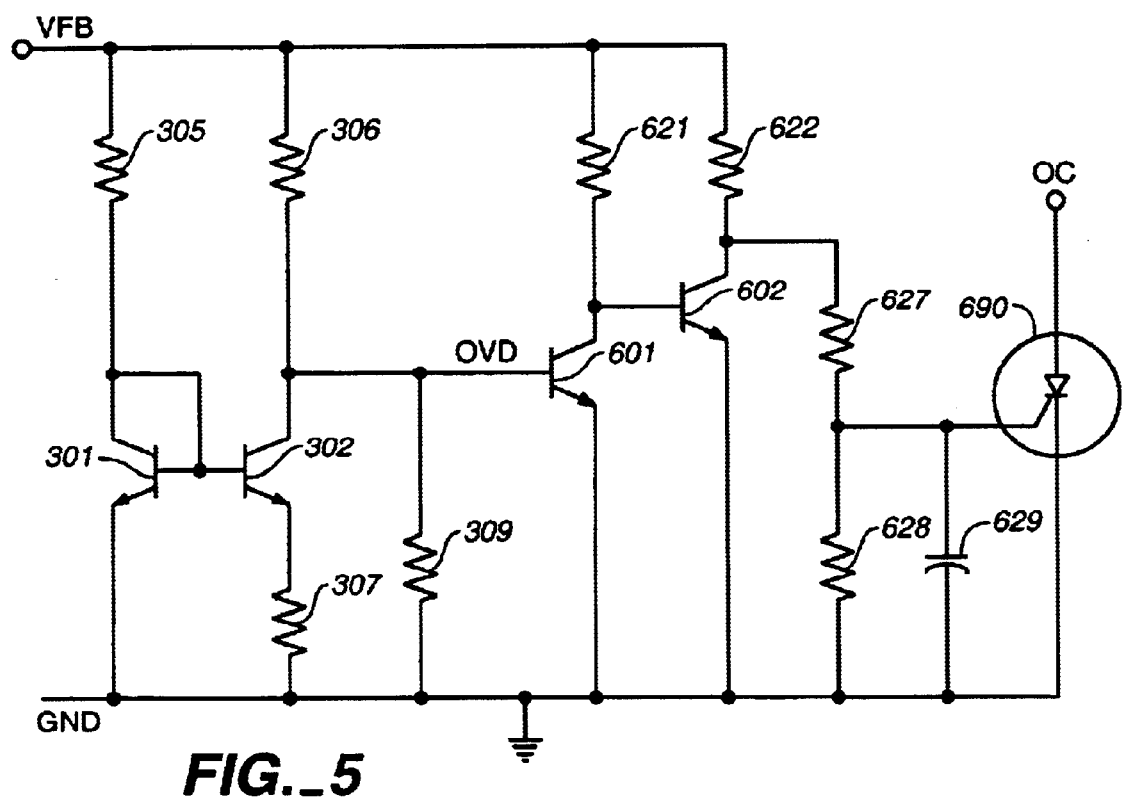
FIG._5

OUTPUT-POWERED OVER-VOLTAGE PROTECTION CIRCUIT

FIELD OF THE INVENTION

This invention generally relates to protection circuitry. The invention more specifically relates to over-voltage protection circuits.

BACKGROUND OF THE INVENTION

There may be various types of protective circuits such as short-circuit protection, over-voltage protection, under-voltage lockout and thermal shutdown. One of the most damaging faults that may occur in voltage regulator circuits may be output over-voltage. Output over-voltage from a voltage regulator circuit may result in the destruction of all or many ICs (integrated circuits) that are being powered by a failing regulator. In the case of a PC (personal computer), very expensive components, such as an MPU (microprocessor unit) may be destroyed. Thus, the cost of failure may be far in excess of the cost of the voltage regulator. In an effort to protect expensive components from destruction, over-voltage protection circuits may be used.

One form of over-voltage protection is the crowbar circuit. In a crowbar circuit when an over-voltage condition is detected, a heavy-duty switch, for example, an SCR (silicon controlled rectifier) is closed so as to effectively short-circuit the output voltage. The resultant heavy current is typically intended to blow a fuse and thus, or otherwise, shut down the over-voltage before there is time to permanently damage expensive components downstream. Crowbar circuits typically use a latching mechanism or a hysteresis circuit to prevent oscillation and/or marginal switching. Crowbar circuits provide good over-voltage protection but they are relatively expensive. As such, crowbar circuits are typically employed in more expensive server computers where the relatively higher costs are readily justified.

Inexpensive and moderately priced PCs are commonly built without a crowbar protection circuit for reasons of economy. Other, cheaper but less effective, forms of over-voltage protection circuit are found in the switching power supply regulators of less expensive computers. The cheaper forms of protection circuit have poorer performance and/or reliability.

SUMMARY

The invention provides for circuit protection including over-voltage protection.

According to an aspect of the invention, a circuit is used for providing a regulated voltage. The circuit comprises an upper transistor connected to an input voltage from a voltage source, a lower transistor connected to the upper transistor, a pulse width modulator for generating control signals for the upper and lower transistors and a voltage protection circuit. The voltage protection circuit comprises an over-voltage detector circuit powered by the regulated voltage. The voltage protection circuit can cause the lower transistor to draw sufficient current from the voltage source such that an over-voltage condition becomes abated.

According to another aspect of the invention, a circuit for protecting against over-voltage is provided. The circuit comprises an over-voltage detector powered by a regulated voltage operable to generate an over-voltage detected signal, an amplifier powered by the regulated voltage operable to generate a trigger signal in response to the over-voltage detected signal, and a thyristor adapted to clamp the regulated voltage in response to the trigger signal.

Other aspects of the invention are possible, some are described below.

BRIEF DESCRIPTION OF THE DRAWINGS

FIG. 1 is a circuit diagram in partial block form of a voltage regulator using a PWM and buck converter arrangement and having an over-voltage protection circuit according to an embodiment of the invention.

FIG. 2 is a schematic diagram of an over voltage detection circuit according to an embodiment of the invention.

FIG. 3 shows an exemplifying characteristic response of one particular embodiment of self-referencing voltage detection circuit according to an embodiment of the invention.

FIG. 4 is a circuit diagram in partial block form of a voltage protection circuit according to an embodiment of the invention.

FIG. 5 shows an alternative embodiment of a voltage protection circuit according to another embodiment of the invention.

For convenience in description, identical components have been given the same reference numbers in the various drawings.

DETAILED DESCRIPTION

In the following description, for purposes of clarity and conciseness of the description, not all of the numerous components shown in the schematic are described. The numerous components are shown in the drawings to provide a person of ordinary skill in the art a thorough enabling disclosure of the present invention. The operation of many of the components would be understood and apparent to one skilled in the art.

FIG. 1 is a block diagram of a voltage regulator using a PWM (pulse width modulator) driving a buck converter and having a voltage protection circuit 220 according to an embodiment of the invention. The voltage regulator receives an input voltage, which may be a regulated or unregulated voltage, VCC2 at an input voltage port 201 and produces a lower regulated output voltage VFB at an output voltage port 104. Upper and lower transistors 110 and 120, which can be MOSFETs (metal oxide semiconductor field-effect transistors), are controlled by PWM controller 150 using, for example, signals UGATE and LGATE respectively.

PWM controller 150 may be powered at port 101 by a supply voltage VCCA 108 formed by a simple low power conditioning circuit. In other embodiments, various arrangements may exist for energizing the PWM controller 150. PWM controller 150 receives phase voltage signal VPH which may swing between near ground GND and near input voltage VCC2, depending on which of transistors 110, 120 is turned on and which is turned off at any moment. The phase voltage signal VPH is smoothed by inductor 131 and capacitor 132 to create output voltage VFB at the output voltage port 104. PWM controller 150 also receives the regulated output voltage VFB as a feedback control signal. Inductor 131 may be a high current device.

In applications that do not use crowbar protection, previously developed over-voltage protection circuits have operated by turning off an upper transistor (in a typical two-transistor buck converter) during an over-voltage condition. However, such circuits typically fail to protect against over-voltage that may be due to a short or "soft short" (excessive, but not runaway, conductance) in the upper transistor. Also, such circuits may fail to protect if the PWM controller were to fail. In some previously developed embodiments, the PWM controller is powered by a regulated voltage or includes its own voltage regulator. Such arrangements may cause over-voltage protection to fail because the power conditioning circuit energizing the PWM controller malfunctions.

In accordance with embodiments of the present invention, over-voltage is protected against by clamping on (turning hard on) the lower transistor during an over-voltage condition. This is an effective protection against a short-circuit or soft short-circuit in the upper transistor. This may be accomplished with a voltage protection circuit 220. The voltage protection circuit 220 can be separate from the PWM and may be powered by the output regulated voltage VFB; this may ensure that over-voltage protection is provided even under conditions of failure of the PWM controller or interruption of power to the PWM controller.

Turning on a lower transistor under over-voltage conditions will typically cause the regulator to draw excessive current from the input voltage port, thereby either shunt regulating the system or blowing the fuse (or other similar over-current protection) in the voltage supply. Either way the over-voltage condition is inhibited.

An important advantage of embodiments of the inventive protection circuit is that they will not trigger when the output is in the normal operating range even if the input voltage is not in the normal range. Such a condition may occur, for example, as a transient condition during start up of the circuits. A second important advantage of embodiments of the inventive protection circuits is that they will not fail to trigger if the output voltage is excessive even if the supply voltage is out of specification (high or low). Such a condition may occur, for example, if the input voltage is low due to malfunction of the upper transistor.

Voltage protection circuit 220 receives feedback regulated output voltage VFB and produces an output signal OV 211 which can be, for example, active when high. When an over-voltage occurs, the OV signal 211 goes high, turning on lower transistor 120 which acts to remove the output over-voltage. Parts of voltage protection circuit 220 may, but need not, receive additional power, such as from VCC2.

OR gate 230 permits lower transistor 120 to be turned on by either OV signal 211 or LGATE signal (from the PWM controller 150). Whenever lower transistor 120 is turned on by OV signal 211, output voltage VFB at port 104 will be pulled down so as to eliminate the over-voltage condition. In some embodiments, OR gate 230 may be a simple wired-OR provided electrical conditions permit; wired-OR arrangements are well known in the art.

FIG. 2 is a schematic diagram of a voltage detection circuit 370 according to an embodiment of the invention. Voltage detection circuit 370 may be part of over-voltage protection circuit 220 (FIG. 1) as discussed below. Input port 350 receives a feedback voltage VFB that may be the output voltage of a voltage regulator. In some embodiments of the invention, voltage detection circuit 370 may be self-referencing. That is, voltage detection circuit 370 compares an input voltage against an internally generated potential difference and produces an output in response to whether or not the input voltage is higher than the internally generated potential difference.

As depicted, voltage detection circuit 370 is formed by resistors 305, 306, 307 and 309 and by transistors 301 and 302 (which can be bipolar junction transistors). The detection circuit 370 generally operates by establishing a switching point for transistor 302 as a function of VFB (at port 350) so that the output node OVD 380 transitions from low to high when VFB transitions from below to above a predetermined threshold voltage. Thus, a switching function is realized by the degenerating effect of resistor 307 coupled with a scaling of the emitter area of transistor 302 versus that of transistor 301. Scaling of emitter areas may be accomplished in various ways; for example multiple transistors in parallel may be used. Transistor 302 is typically designed with a larger emitter area than transistor 301 and therefore conducts more current when both transistors are biased with equal base to emitter voltages (and equal current densities). When VFB is below the predetermined threshold voltage, low current levels conduct through transistors 301, 302 and resistor 307 has a small degenerating effect. Under this condition, transistor 302 saturates and drives the output OVD 380 low. Conversely, when VFB is above the predetermined threshold voltage, resistor 307 has a large degenerating effect which in turn reduces the current in transistor 302 and drives output OVD high.

In one particular embodiment, resistors 305, 306, 307, 309 may have values of 40K, 40K, 2K and 50K respectively. In one embodiment, transistors 301 and 302 may be implemented on the same semiconductor chip but have an emitter ratio of 1:5 respectively. A detected over-voltage signal OVD is generated at output port 380. In the depicted embodiment, the detected over-voltage signal is driven high whenever the input voltage VFB exceeds the predetermined threshold voltage for the circuit 370. The voltage threshold applicable is equal to the Vbe (base to emitter) voltage of transistor 410 in circuit 220 (FIG. 4). Whenever OVD is equal to a Vbe, transistors 301 and 302 will have equal collector voltages. Thus, resistors 305 and 306 will be at the same voltages and will have the same currents. Resistor 309 will then shunt some of the current from resistor 306 to ground. Thus, transistor 302 will have less current than transistor 301. Transistor 302 may, therefore, be biased at a current density less than transistor 301 by the factor of the emitter ratio (5 for the depicted embodiment) times the current difference. This may result in a Vbe difference equal to $V_T$ times the natural logarithm of the current density difference. This voltage difference will appear across resistor 307. The use of the $V_T$ thermal voltage is well known in the art.

The values of all 4 resistors in circuit 370 therefore determine the value of VFB needed to produce a detected over-voltage signal OVD. In the depicted embodiment, this may occur when VFB is approximately equal to 2.5V. The exact value depends on the emitter size and processing of the transistors, but those with skill in the design of analog IC's will understand how to adjust the values of the resistors accordingly to produce the desired threshold voltage. The values chosen for the depicted embodiment were also chosen to produce a low temperature coefficient for the VFB threshold voltage. Those skilled in analog IC design will also understand how to adjust the temperature coefficient and VFB threshold value by choosing particular values for the 4 resistors of circuit 370.

FIG. 3 shows an exemplifying characteristic response of one particular embodiment of referencing voltage detection circuit 370 (FIG. 2). The horizontal axis represents input voltage (in volts) for VFB signal and the vertical axis represents output voltage (also in volts) for OVD signal. The figure shows a first threshold at an input voltage of approximately 600 mV or so. For input voltages below the first threshold, there is insufficient base-to-emitter voltage to turn transistor 302 (FIG. 2) on. Therefore, transistor 302 (FIG. 2) is cut off and the output is simply determined by the potential divider action of resistors 306 and 309 (both in FIG. 2). Thus, even though the input may rise as high as 600 mV, the output OVD (FIG. 2) may be limited to a maximum of approximately 330 mV, which is defined as low or inactive.

In the characteristic response shown in FIG. 3, a second threshold appears at an input voltage of about 2.5 Volts. This second threshold reflects the bandgap action of the circuit. Thus, the output is held low until the threshold condition is reached such that resistor 307 (FIG. 2) can pass no more current without raising the emitter voltage of transistor toward cut off. Thus, the circuit may provide the desirable behavior of the OVD signal being less than a base to emitter voltage for input voltages below the second threshold and above a base to emitter voltage for input voltages above the second threshold. Thus, the voltage detection circuit in accordance with some embodiments of the invention may reliably detect voltages in excess of about 2.5 Volts. The circuit may be adapted for other voltages by varying the values of the resistors, as would be understood by those skilled in the art.

FIG. 4 is a schematic diagram of a voltage protection circuit 220 according to an embodiment of the invention. Input port 450 receives a feedback voltage VFB which is applied to input port 350 of voltage detection circuit 370. In the embodiment depicted supply voltage VCC2 is used in addition to VFB.

Output OVD 380 signal of voltage detection circuit 370 is applied to the base of transistor 410, causing transistor 410 to turn on when an over-voltage is detected. The turning on of transistor 410 causes transistor 430 to turn off and the current flow in diode 433 is increased. This increased current in diode 433 turns on transistor 410 harder, thus adding hysteresis to the circuit and preventing undesirable circuit behavior in marginal operating conditions.

In one embodiment, resistors 431, 411, 432 and 421 may have values of 8K, 40K, 5K and 8K respectively. When an over-voltage condition occurs, transistor 410 is turned on and thus turning off transistor 420. In turn, output OV 211 is pulled high through resistor 421.

The circuits described above may provide reliable triggering and no false triggering, when over-voltage occurs. For example, the voltage detection circuit may be self-powered from the output and does not rely upon the supply voltages VCC2, VCCA. Thus, even if no supply power (e.g. VCC2 or VCCA) is provided, the voltage protection circuit still provides protection against over-voltage. In contrast, previously developed solutions that place the over-voltage protection in the PWM controller chip require proper chip power supply voltage to function. Furthermore, during startup when voltages are small and transistor 302 (FIG. 2) is turned off, the OVD signal will not become high because of the voltage divider action of resistors 306, 309 taken together. This eliminates or greatly reduces the occurrence of false trips during startup, a time during which supply voltages may be out of tolerance. Thus, only a genuine over-voltage condition on the output voltage VFB will cause the circuit to trip. In addition, robust passive (resistor) pull-ups are used rather than active pull-ups since active pull-ups can cause false trips. The circuit may be biased with either VFB or VCC2, it is operable to use VCC2 in this manner because any fault that may occur must actually originate from VCC2 since that is the supply that drives the high power MOSFETs.

FIG. 5 shows an alternative embodiment of a voltage protection circuit according to another embodiment of the invention. As in the embodiments described above, transistors 301, 302 and resistors 305, 306, 307 and 309 may form an over-voltage detection circuit, which receives sense voltage VFB. Inverters implemented by transistors 601, 602, together with their respective pull-up resistors 621, 622, buffer the over-voltage signal OVD. These inverters are powered by the sense voltage VFB input, thus this circuit will protect against over-voltage conditions even when the input voltage (e.g. VCC2) is below a volt or so.

Referring again to FIG. 5, in a typical arrangement, resistors 627, 628 and capacitor 629 function to trigger SCR (silicon-controlled rectifier) 690 when over-voltage conditions are detected. When triggered the SCR 690 will clamp the over-voltage output clamp terminal OC which may be connected to clamp the lower transistor in a two-transistor buck converter circuit. As will be apparent to one of ordinary skill in the art, other similar circuit arrangements are possible within the general scope of the invention. For example, a different type of thyristor, such as a triac, may be used with an appropriate trigger circuit in place of the silicon-controlled rectifier referred to above.

Embodiments of the invention as described herein have significant advantages over previously developed implementations. As will be apparent to one of ordinary skill in the art, other similar circuit arrangements are possible within the general scope of the invention. For example, the invention need not be limited to voltage regulators that incorporate a PWM, various other types of switching regulators such as constant on time, hysteretic and PFM (pulse frequency modulation) may be employed within the general scope of the invention. Even non-switching regulators such as a linear that has a push pull output may be similarly deployed. The embodiments described above are intended to be exemplary rather than limiting and the bounds of the invention should be determined from the claims.

What is claimed is:

1. A circuit for providing a regulated voltage comprising:
 a switching voltage regulator, comprising:
  an upper transistor connected to an input voltage from a voltage source, the upper transistor having a control terminal;
  a lower transistor connected to the upper transistor, the lower transistor having a control terminal; and
  a voltage regulator controller connected to receive the regulated voltage, the voltage regulator controller operable to generate a first control signal applied to the control terminal of the upper transistor, and further operable to generate a second control signal applied to the control terminal of the lower transistor; and
 a voltage protection circuit comprising:
  an over-voltage detector circuit powered by the regulated output voltage operable to detect an over-voltage condition and further operable to generate an over-voltage detected signal, wherein the over-voltage detected signal causes the lower transistor to draw sufficient current from the voltage source such that the over-voltage condition is abated.

2. The circuit of claim 1 wherein:
 the over-voltage detector circuit is powered solely by the regulated output voltage.

3. The circuit of claim 1 wherein:
 the voltage regulator controller comprises a pulse width modulator.

4. The circuit of claim 1 wherein:

the voltage protection circuit is operable to generate a clamp signal in response to the over-voltage detected signal, wherein the clamp signal is supplied to the control terminal of the lower transistor and wherein the clamp signal causes the lower transistor to draw sufficient current from the input voltage source such that the over-voltage condition is abated.

5. The circuit of claim 1 wherein:

the over-voltage condition is abated by causing the voltage source to shut down.

6. The circuit of claim 1 wherein:

the over-voltage condition is abated by shunting the regulated voltage.

7. A circuit for protecting against over-voltage comprising:

an over-voltage detector powered by a regulated output voltage generated by the circuit operable to generate an over-voltage detected signal;

an amplifier powered by the regulated voltage operable to generate a trigger signal in response to the over-voltage detected signal; and a thyristor adapted to clamp the regulated voltage in response to the trigger signal.

8. The circuit of claim 7 wherein:

the over-voltage detector is a self-regulating bandgap detector.

9. The circuit of claim 8 wherein:

the thyristor comprises a silicon controlled rectifier.

10. A method for providing a regulated voltage comprising:

providing a switching voltage regulator, comprising:

providing an upper transistor connected to an input voltage from a voltage source, the upper transistor having a control terminal;

providing a lower transistor connected to the upper transistor, the lower transistor having a control terminal; and providing a voltage regulator controller connected to receive the regulated voltage, the voltage regulator operable to generate a first control signal applied to the control terminal of the upper transistor, and further operable to generate a second control signal applied to the control terminal of the lower transistor; and providing a voltage protection circuit comprising:

an over-voltage detector circuit powered by the regulated output voltage operable to detect an over-voltage condition and further operable to generate an over-voltage detected signal, wherein the over-voltage detected signal causes the lower transistor to draw sufficient current from the voltage source such that the over-voltage condition is abated.

11. The method of claim 10 wherein:

the voltage regulator comprises a pulse width modulator.

12. A method for protecting against over-voltage conditions comprising:

providing a circuit for protecting against over voltage;

providing an over-voltage detector powered by a regulated output voltage generated by the circuit operable to generate an over-voltage detected signal;

providing an amplifier powered by the regulated output voltage operable to generate a trigger signal in response to the over-voltage detected signal; and providing a thyristor operable to clamp the regulated voltage in response to the trigger signal.

13. The method of claim 12 wherein:

the thyristor is a silicon-controlled rectifier.

* * * * *